United States Patent [19]

Schanne

[11] Patent Number: 5,082,116

[45] Date of Patent: Jan. 21, 1992

[54] TRAVELING CARD TABLE

[76] Inventor: Nancy E. Schanne, 9703 Fieldcrest Dr., Omaha, Nebr. 68114

[21] Appl. No.: 675,459

[22] Filed: Mar. 26, 1991

[51] Int. Cl.[5] .............................. B65D 69/00
[52] U.S. Cl. ........................ 206/579; 273/148 A
[58] Field of Search .................. 273/148 A; 206/579

[56] References Cited

U.S. PATENT DOCUMENTS

| 1,404,945 | 1/1922 | Epstein | 206/579 |
|---|---|---|---|
| 1,462,471 | 4/1923 | Alpiner . | |
| 2,491,894 | 12/1949 | Fox . | |
| 2,772,886 | 12/1956 | Parmele . | |

Primary Examiner—William I. Price
Attorney, Agent, or Firm—Zarley, McKee, Thomte, Voorhees & Sease

[57] ABSTRACT

A traveling card table comprised of a flexible sheet member having card pockets and pencil pockets provided at the upper surface thereof. An elongated flexible strap is secured to the underside of the card table and is designed to receive either a magazine or a tray table to provide the necessary stability to the card table to enable a card game to be played thereon.

4 Claims, 2 Drawing Sheets

TRAVELING CARD TABLE

BACKGROUND OF THE INVENTION

This invention relates to a traveling card table and more particularly to a flexible sheet member which may be rolled or folded for storage but which may be secured to either a magazine or an airplane tray table to provide the necessary stability thereto.

Many card players find it difficult to play cards in such locations as on the beach, in airplanes, etc. In such locations, the cards are either blown from their supporting surface or tend to slip therefrom during takeoff or landing when the game is being played on an airplane.

It is therefore a principal object of the invention to provide an improved traveling card table.

A further object of the invention is to provide a device of the type described which may be secured to either an airplane tray table or a magazine so as to provide the necessary flat supporting surface for the card game.

Still another object of the invention is to provide a traveling card table which has a non-slip surface provided on the upper surface thereof which prevents cards from inadvertently slipping therefrom.

Still another object of the invention is to provide a traveling card table which is economical of manufacture, durable in use and refined in appearance.

These and other objects will be apparent to those skilled in the art.

SUMMARY OF THE INVENTION

A traveling card table is provided and is comprised of a flexible sheet member preferably comprised of a suede or suede-like material having a non-slip top surface, a bottom surface, opposite ends and opposite sides. The top surface of the card table is provided with pockets which are adapted to receive playing cards or score pads. The top surface of the card table is also provided with pencil receiving pockets. An elastic strap is secured to the bottom surface of the card table and is designed to embrace either a magazine or an airplane tray table to provide the necessary stability and flat playing surface for the card table.

BRIEF DESCRIPTION OF THE PREFERRED EMBODIMENT

Figure 1:
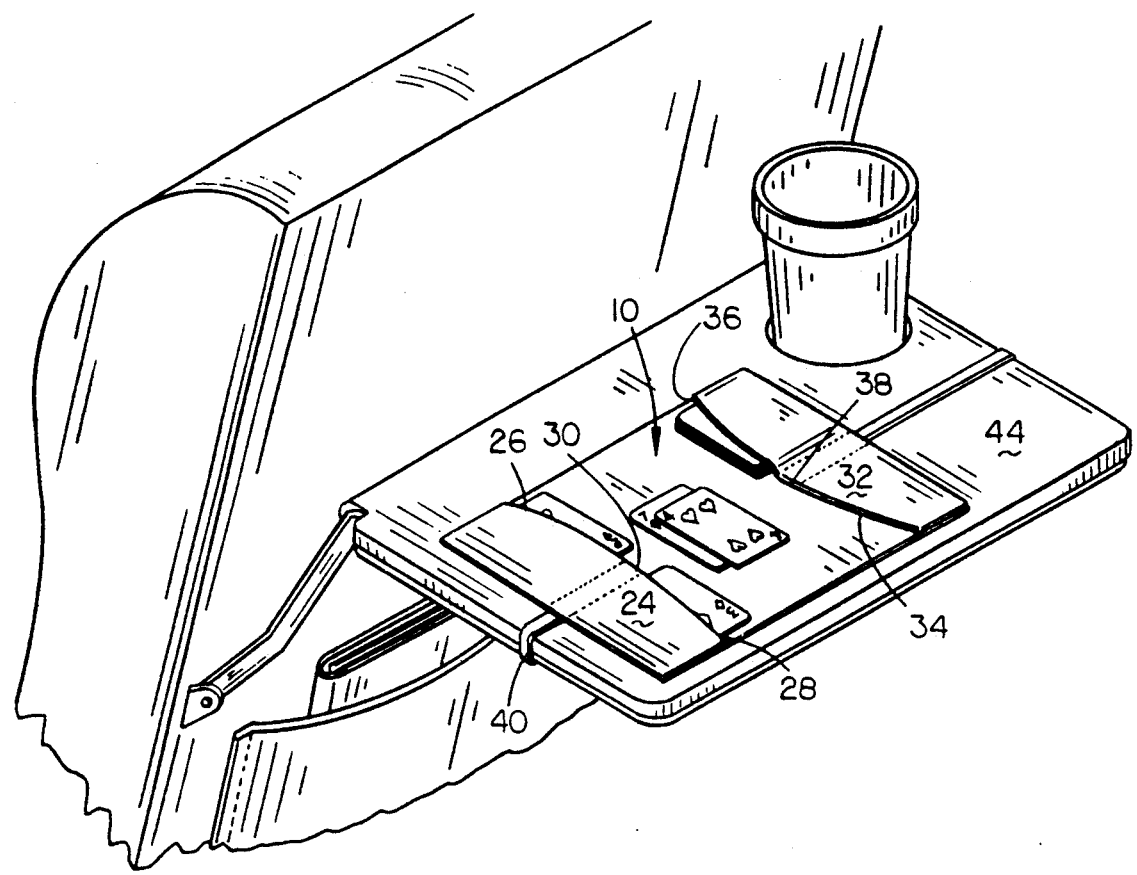
FIG. 1 is a perspective view of the card table of this invention mounted on an airplane tray table.
Figure 2:
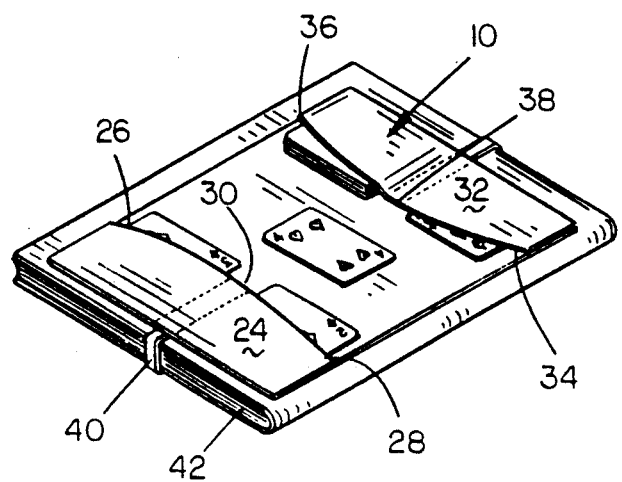
FIG. 2 is a perspective view of the card table of this invention mounted on a magazine.

The traveling or portable card table of this invention is referred to generally by the reference numeral 10 which is comprised of a flexible sheet member having a bottom surface 12, top surface 14, opposite ends 16 and 18, and opposite sides 20 and 22. A smaller sheet member 24 is positioned on the top surface of the card table 10 adjacent one end thereof and is sewn thereto or secured thereto by any other convenient means so as to create card pockets 26 and 28 separated by a pencil pocket 30.

Similarly, a sheet member 32 is also positioned on the top surface 14 of the card table 10 by any convenient means to provide card pockets 34 and 36 which are separated by a pencil pocket 38.

Figure 3:
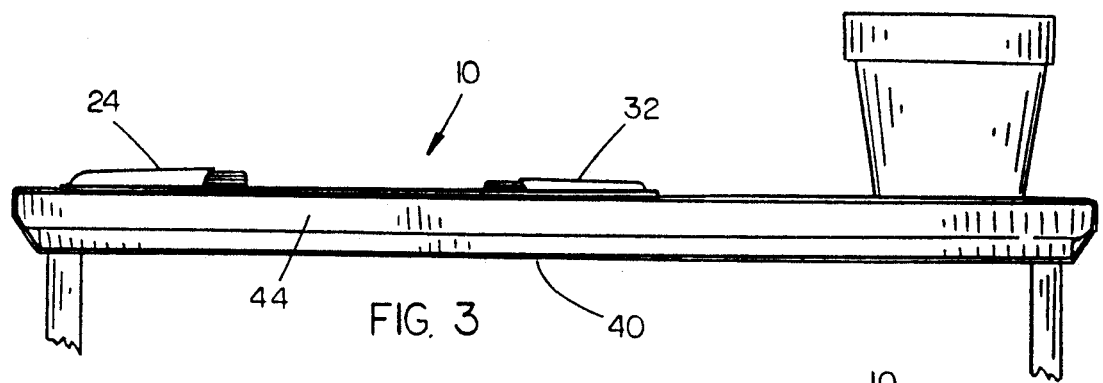
FIG. 3 is an end view of the card table of this invention mounted on the tray table.
Figure 4:
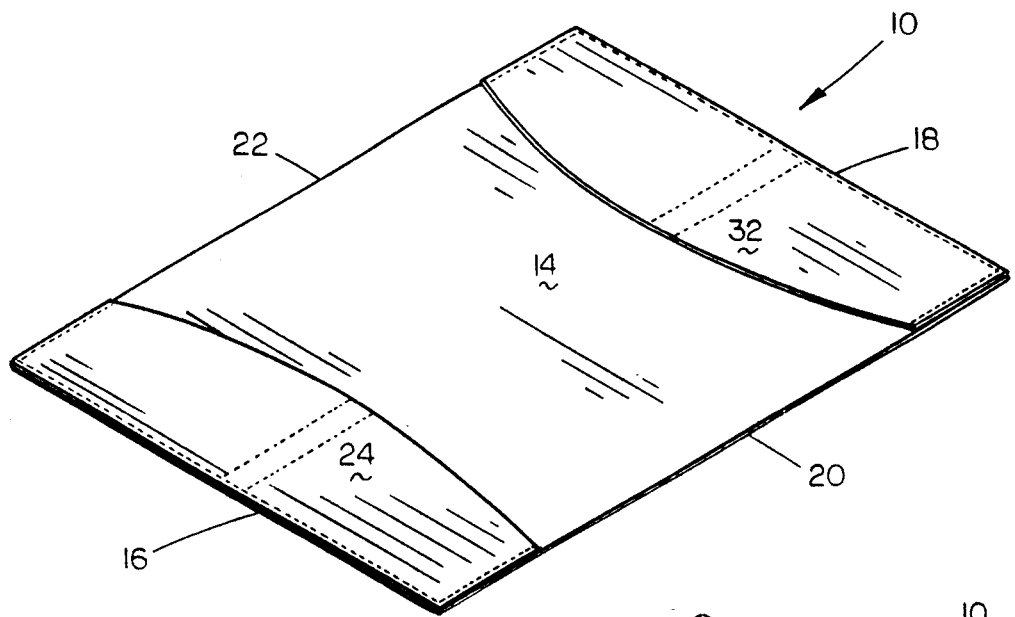
FIG. 4 is a perspective view of the card table.
Figure 5:
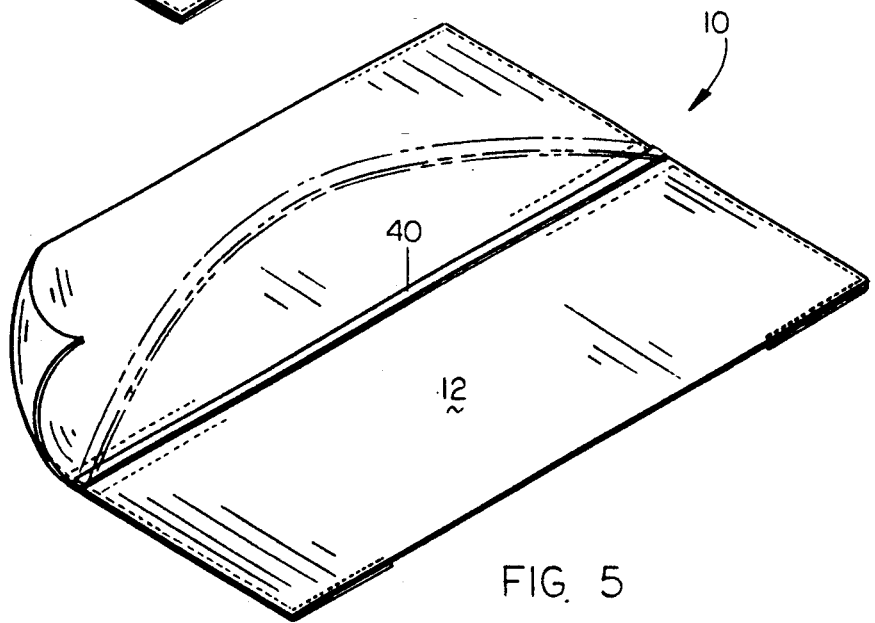
FIG. 5 is a bottom perspective view of the card table.

Since the card table 10 is flexible, it would be difficult to support the same on a person's lap. Therefore, an elongated elastic strap 40 is provided which is secured to the bottom surface of the card table 10 at ends 16 and 18 and which extends therebetween as seen in the drawings. The dimensions of the card table 10 are such that a conventional magazine 42 such as an airline magazine may be positioned directly beneath bottom surface 12 with the strap 40 embracing the same. The elongated flexible strap 40 ensures that the card table 10 will be maintained on the magazine or the like with the necessary stability and so that the card table will provide a flat playing surface. The dimensions of the card table 10 are also such that the card table 10 may be positioned on an airline tray 44 with the strap 40 extending therearound as illustrated in FIGS. 1 and 3 to maintain the card table 10 on the tray.

Thus it can be seen that a novel traveling card table has been provided which can be rolled or folded for transport but which may be secured or positioned on either a magazine or a tray table so as to provide a flat card playing surface. It is preferred that the card table 10 be constructed of a suede material or suede-like material so as to provide a non-slip playing surface so that the cards will not inadvertently slip therefrom. During the playing of any game, the cards, whether they be the deck or discards, may be inserted into any of the card pockets 26, 28, 34 or 36. A score pad may be inserted into one of the pockets 26, 38, 34 or 36 if desires. The scoring pencils may be inserted into either of the pencil pockets 30 or 38.

Thus it can be seen that the traveling card table of this invention accomplishes all of its stated objectives.

I claim:

1. A traveling card table, comprising,
    a flat, flexible sheet member having a top surface, a bottom surface, opposite ends and opposite sides,
    said sheet member having a plurality of card receiving pockets provided on its upper surface,
    and a flexible strap means at the bottom surface of said sheet member which extends between the opposite ends or the opposite sides thereof for receiving a supporting member to enable said sheet member to be positioned thereon.

2. The traveling card table of claim 1 wherein said strap member is comprised of a resilient material.

3. The traveling card table of claim 1 wherein said sheet member has a non-slip surface provided on its top surface.

4. The traveling card table of claim 1 wherein said sheet member is provided with at least one pencil receiving pocket on its top surface.

* * * * *